(12) United States Patent
Lines

(10) Patent No.: US 9,461,328 B1
(45) Date of Patent: Oct. 4, 2016

(54) SOLID OXIDE FUEL CELL POWER PLANT HAVING A BOOTSTRAP START-UP SYSTEM

(75) Inventor: Michael T Lines, South Windsor, CT (US)

(73) Assignee: Ballard Power Systems Inc., Burnaby (CA)

( * ) Notice: Subject to any disclaimer, the term of this patent is extended or adjusted under 35 U.S.C. 154(b) by 1050 days.

(21) Appl. No.: 13/589,281

(22) Filed: Aug. 20, 2012

(51) Int. Cl.
| | |
|---|---|
| H01M 8/22 | (2006.01) |
| H01M 8/04 | (2016.01) |
| H01M 8/02 | (2016.01) |
| H01M 8/24 | (2016.01) |

(52) U.S. Cl.
CPC ............... *H01M 8/22* (2013.01); *H01M 8/02* (2013.01); *H01M 8/04* (2013.01); *H01M 8/04253* (2013.01); *H01M 8/2465* (2013.01)

(58) Field of Classification Search
CPC .... H01M 8/04; H01M 8/02; H01M 8/04253; H01M 8/2465; H01M 8/22
See application file for complete search history.

(56) References Cited

U.S. PATENT DOCUMENTS

| | | | |
|---|---|---|---|
| 7,410,016 B2 | 8/2008 | Schumann et al. | |
| 7,588,849 B2 | 9/2009 | Haltiner, Jr. et al. | |
| 7,645,532 B2 | 1/2010 | Weiss et al. | |
| 2003/0039872 A1* | 2/2003 | Grasso ..................... | F28C 3/04 429/437 |
| 2003/0134168 A1* | 7/2003 | Assarabowski ... | H01M 8/04007 429/429 |
| 2003/0235725 A1* | 12/2003 | Haltiner, Jr. ........... | B01J 19/249 429/425 |
| 2005/0106429 A1* | 5/2005 | Keefer .............. | H01M 8/04097 429/410 |
| 2008/0318092 A1* | 12/2008 | Sridhar ..................... | C01B 3/34 429/418 |
| 2009/0104484 A1 | 4/2009 | Fujimura et al. | |
| 2012/0129062 A1* | 5/2012 | Fernandes ........... | H01M 8/0618 429/415 |

FOREIGN PATENT DOCUMENTS

| | | | | |
|---|---|---|---|---|
| CN | 101764238 | * | 6/2010 | .............. H01M 8/04 |
| CN | 102035004 | * | 4/2011 | ........ H01M 8/04268 |

OTHER PUBLICATIONS

David Tsay, "Feasibility Study of Fuel Cell Residential Energy Stations," Jun. 2003, 52 Pages.

* cited by examiner

*Primary Examiner* — Patrick Ryan
*Assistant Examiner* — Aaron Greso
(74) *Attorney, Agent, or Firm* — Seed IP Law Group PLLC

(57) ABSTRACT

The bootstrap start-up system (42) achieves an efficient start-up of the power plant (10) that minimizes formation of soot within a reformed hydrogen rich fuel. A burner (48) receives un-reformed fuel directly from the fuel supply (30) and combusts the fuel to heat cathode air which then heats an electrolyte (24) within the fuel cell (12). A dilute hydrogen forming gas (68) cycles through a sealed heat-cycling loop (66) to transfer heat and generated steam from an anode side (32) of the electrolyte (24) through fuel processing system (36) components (38, 40) and back to an anode flow field (26) until fuel processing system components (38, 40) achieve predetermined optimal temperatures and steam content. Then, the heat-cycling loop (66) is unsealed and the un-reformed fuel is admitted into the fuel processing system (36) and anode flow (26) field to commence ordinary operation of the power plant (10).

6 Claims, 1 Drawing Sheet

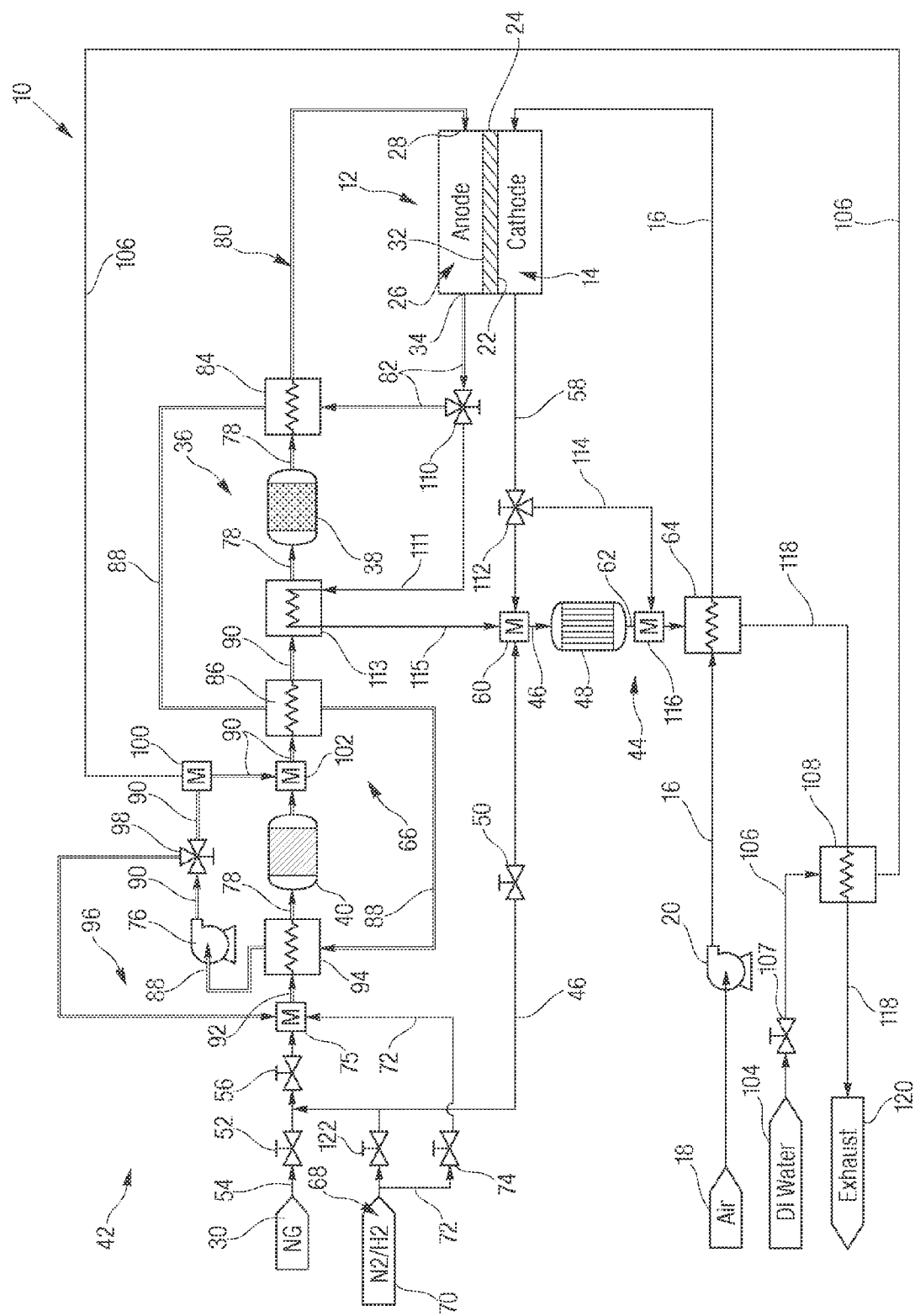

SOLID OXIDE FUEL CELL POWER PLANT HAVING A BOOTSTRAP START-UP SYSTEM

STATEMENT REGARDING FEDERALLY SPONSORED RESEARCH OR DEVELOPMENT

This invention was made with government support under Contract No. DE-NT0003894 awarded by the Department of Energy. The Government therefore has certain rights in this invention.

TECHNICAL FIELD

The present disclosure relates to solid oxide fuel cells and in particular relates to a solid oxide fuel cell power plant wherein the plant includes a start-up system that minimizes coking or soot formation on plant components.

BACKGROUND ART

Fuel cells are well known and are commonly used to produce electrical current from reducing fluid fuel and oxygen containing oxidant reactant streams, to power various types of electrical apparatus. Known solid oxide fuel cells ("SOFC") generate both electricity and heat by electrochemically combining a fluid reducing fuel and an oxidant across an ion conducting electrolyte. In a typical SOFC, the electrolyte is an ion conductive ceramic membrane sandwiched between an oxygen electrode (cathode) and a fuel electrode (anode). Molecular oxygen, such as from the atmosphere, reacts with electrons at the cathode electrode to form oxygen ions, which are conducted through the ceramic membrane electrolyte to the anode electrode. The oxygen ions combine with a reducing fuel such as a mixture of hydrogen and carbon monoxide to form water and carbon dioxide while producing heat and releasing electrons to flow from the anode electrode through an electrical circuit to return to the cathode electrode.

Solid oxide fuel cells have many benefits and some limitations. For example, normal operating temperatures are very high, often in excess of 700° C., which favors stationary power plants operating in a near steady-state mode to minimize deleterious effects of thermal cycling as the fuel cell is started up and shut down. Solid oxide fuel cell based power plants nonetheless are designed to sustain a number of start-stop cycles throughout their operational terms such as for initial start-up, regular maintenance, repairs, etc. Additionally, most such solid oxide fuel cell power plants operate on a supply of natural gas that has to be processed to eliminate unacceptable components and to produce high quality, hydrogen-rich fuel. Such fuel processing systems typically include at least a desulfurizer, a reformer (such as a catalytic, steam reformer, and other reformers well-known in the art) and possibly a shift reactor, and a variety of heat exchangers configured to have the components of the fuel processing system operate at optimal temperatures.

A substantial problem associated with starting up solid oxide fuel cells with fuel processing systems is formation of soot, or coking of the fuel reactant stream as it passes through the fuel processing system at relatively low start-up temperatures. Many efforts have been undertaking to minimize problems associated with efficient heating of solid oxide fuel cell power plant components during start-up. For example, U.S. Pat. No. 7,410,016 that issued on Aug. 12, 2008 to Schumann et al. discloses use of a combustion chamber upstream of a catalytic reformer that ignites a portion of a fuel/air mixture to provide a hot combustion exhaust that is fed through fuel processing components to rapidly bring the components up to an operating temperature.

Additionally, U.S. Pat. No. 7,588,849 that issued on Sept. 15, 2009 to Haltiner, Jr. et al. discloses use of a tail gas combustor to direct flow of heated exhaust stream through jacket spaces surrounding fuel cells in a solid oxide fuel cell stack to rapidly heat up the fuel cells during a start-up procedure. More recently, U.S. Pat. No. 7,645,532 that issued on Jan. 12, 2010 to Weiss et al. discloses use of a reformate combustor between a reformer and a fuel cell stack so that partially burned reformate is passed through the anode chambers of the cell. Weiss et al. includes structures that thermodynamically decouple the fuel cell stack from components of the fuel processing system so that each may operate at differing optimal temperatures.

While these and many other disclosures seek to produce a rapid start-up procedure for a solid oxide fuel cell power plant, unfortunately such known start-up procedures involve extraordinary complexity in controlling various combustors, high-temperature blowers, complicated mechanical components, etc. Moreover, known solid oxide fuel cell power plants that include rapid-heating start-up systems invariably require non-plant based start-up power sources to operate the complicated rapid-heating start-up combustors, valves, control systems, etc, prior to production of any electricity by the plant.

Additionally, it is known that minimizing production of soot, or coking, during fuel reforming within the fuel processing system is not just a function of heating, but also typically includes provision of an adequate volume of high-temperature steam. An optimal steam to carbon ratio in such fuel processing systems is generally considered to be 2:1. A major challenge in producing an efficient start-up system for a solid oxide fuel cell power plant is to provide an adequate amount of steam at a sufficiently high-temperature so that when a carbon-based fuel is introduced into the fuel processing system, no coking occurs to contaminate fuel processing system and fuel cell components. Providing an appropriate amount of steam at a proper temperature to start-up a solid oxide fuel cell power plant from non-plant resources requires additional costs and sitting challenges that further reduce efficiencies of the power plant.

Known rapid-heating start-up systems of solid oxide fuel cell power plants have not provided efficient, soot-free start-ups, and therefore have not gained widespread usage due to their substantial costs to manufacture, install, operate and maintain. Therefore, there is a need for a solid oxide fuel cell power plant that includes an efficient, self-contained, rapid start-up system.

SUMMARY OF THE INVENTION

The disclosure includes a solid oxide fuel cell power plant having a bootstrap start-up system for achieving an efficient start-up of the power plant that minimizes formation of soot within a reformed hydrogen rich fuel. A burner receives un-reformed fuel directly from the fuel supply and combusts the fuel to heat cathode air which then heats an electrolyte within the fuel cell. A dilute hydrogen forming gas cycles through a sealed heat-cycling loop to transfer heat and steam from an anode side of the electrolyte through fuel processing system components and an anode flow field until fuel processing system components achieve predetermined optimal temperatures and steam content. Then, the heat-cycling loop is unsealed and the un-reformed fuel is admitted into the fuel processing system and anode flow field to commence operation of the power plant in generating electricity. The burner then combusts unused fuel from the anode exhaust to continue heating the cathode air.

More specifically, the solid oxide fuel cell (hereinafter occasionally referred to as "SOFC") power plant includes at least one SOFC having a cathode flow field that is configured for receiving a flow of an oxidant reactant through a cathode inlet line from a compressed oxidant supply. The cathode flow field is also configured for directing flow of the oxidant reactant through the cathode flow field in fluid communication with the cathode electrode side of the electrolyte. An anode flow field is configured for receiving a flow of a hydrogen-rich reducing fuel through an anode inlet from the fuel supply. The anode flow field is also configured for directing flow of the reducing fuel adjacent the opposed anode electrode side of the electrolyte and out of the fuel cell through an anode exhaust. A fuel processing system is secured in fluid communication between the fuel supply and the anode inlet for directing flow of the reducing fuel through components of the fuel processing system for producing the hydrogen-rich reducing fuel from the fuel supply.

A bootstrap start-up system includes a direct fuel cathode air heater that has a burner feed line secured in fluid communication between the fuel supply and the burner. The burner exhaust line is secured in fluid communication between the burner and a cathode air heat exchanger for transferring hot combusted gases from the burner through the exhaust line and into the heat exchanger. The cathode inlet line is secured in fluid communication between the cathode air heat exchanger and the cathode flow field for directing the heated cathode air adjacent the cathode electrode side of the electrolyte.

The bootstrap start-up system also includes the heat-cycling loop that is secured in fluid communication between the anode exhaust and the anode inlet. The heat-cycling loop is also configured to receive a predetermined fill-volume of a forming gas from a forming gas supply. The heat-cycling loop cycles flow of the forming gas from a forming gas inlet to and through a heat-cycling loop blower, through the components of the fuel processing system, through the anode inlet, through the anode flow field adjacent the anode electrode side of the electrolyte, through the anode exhaust and back to and through the heat-cycling loop blower. The heat-cycling loop is configured for sealed cycling flow of the forming gas through the heat-cycling loop during start-up of the power plant. The heat-cycling loop continuously cycles the forming gas through the loop to transfer heat from the electrolyte until the anode flow field and components of the fuel processing system achieve predetermined start-up temperatures.

The forming gas may be a mixture of about four percent hydrogen gas and about ninety-six percent nitrogen gas. (For purposes herein, the word "about" means plus or minus ten percent.) This mixture is also referred to herein as a "dilute hydrogen gas". By including the small amount of hydrogen in the forming gas, a small amount of electricity is produced and steam is thereby formed at the anode electrode and moves into the forming gas to cycle through the heat-cycling loop. It is to be understood, however, that any forming gas may be utilized that has the capacity to transfer heat while cycling through the loop. If the forming gas does not include hydrogen, the system may simply inject steam into the heat-cycling loop prior to admitting un-reformed fuel, such as natural gas, into the fuel processing components.

The heat-cycling loop may also include a fuel cell heat exchanger secured in heat exchange relationship with an exhaust segment of the loop and with an inlet segment of the loop. The fuel cell heat exchanger may be dimensioned so that very hot forming gas leaving the fuel cell in the exhaust segment of the loop immediately transfers some heat back into the fuel cell through the forming gas passing through the inlet segment of the loop just upstream of the anode flow field in order to provide more heat to the fuel cell than to specific components of the fuel precession system.

One of the components of the fuel processing system may be a reformer secured so that the forming gas circulating through the heat-cycling loop passes through the reformer to heat it to an optimal operating temperature. The loop may also include a reformer heat exchanger secured in fluid communication with a middle segment of the loop. The middle segment of the loop is secured to the fuel cell heat exchanger and directs flow of the heated forming gas in a direction away from the fuel cell heat exchanger. The heat-cycling loop continues to direct flow of the heated forming gas through the middle segment and away from the reformer heat exchanger to a heat-cycling loop blower that forces the circulating flow of the forming gas through the loop. The blower forces flow of the forming gas back toward the fuel cell through return segments of the heat-cycling loop. The reformer heat exchanger is also secured in heat exchange relationship between the middle segment and a first return segment of the heat-cycling loop. The first return segment of the loop directs flow of the returning forming gas from the blower into the reformer. The reformer heat exchanger is dimensioned to extract heat from forming gas in the middle segment and to transfer that heat into the forming gas passing through the first return segment in order to facilitate heating of the reformer to a predetermined optimal temperature.

The fuel processing components may also include a desulfurizer secured in fluid communication with the heat-cycling loop so that the desulfurizer achieves a predetermined optimal temperature during start-up of the power plant. A desulfurizer heat exchanger may be secured in heat exchange relationship with the middle segment of the heat-cycling loop and a second return segment of the loop. The desulfurizer heat exchanger may be dimensioned to extract heat from forming gas passing through the middle segment and to transfer that heat into forming gas passing through the second return segment to facilitate transfer of an appropriate amount of heat into the desulfurizer.

The inventor herein has determined that in such SOFC power plants an optimal temperature for a SOFC stack is about 700° C. (seven hundred degrees Celsius), an optimal temperature for a fuel reformer is about 600° C., and that an optimal temperature for a desulfurizer is about 300° C. (These temperatures are exemplary in terms of comparing optimal temperatures of plant components, and are not necessarily accurate for any particular SOFC power plant.)

Because the desulfurizer may achieve an optimal temperature before the reformer and the SOFC, a desulfurizer bypass loop may be included wherein the loop directs flow of the forming gas to flow either from the middle segment through the desulfurizer heat exchanger and back through the second return segment, desulfurizer heat exchanger and into the desulfurizer. Alternatively, the desulfurizer bypass loop may direct flow of the forming gas from the middle segment and around the desulfurizer into the first return segment and then into the reformer heat exchanger and reformer. The desulfurizer bypass loop may also be configured to or be controlled to (such as by a controllable three-way valve) direct a very substantial portion of the forming gas from the middle segment into the first return segment, while directing a small portion of the forming gas to flow through the desulfurizer heat exchanger and desulfurizer. This may provide for the desulfurizer achieving an optimal operating temperature at the same time that the reformer and fuel cell achieve optimal operating temperatures, wherein the reformer and the fuel cell or SOFC stack require more heat. Dimensioning of, or control of flow through the fuel stack heat exchanger, reformer and desulfurizer heat exchanger provide for an extremely efficient use of the heat to preferably simultaneously achieve optimal operating temperatures of the SOFC and fuel cell components prior to permitting entry of any carbon from the fuel into the fuel processing system components and the fuel cell.

In a further embodiment the forming gas inlet may be configured to permit a bleed in of small amounts of the forming gas when the forming gas includes dilute hydrogen during the start-up of the power plant. The addition of the dilute hydrogen forming gas to the heat-cycling loop permits a low level of operation of the SOFC so that the resulting byproduct of water formed at the anode electrode may become steam. The amount of steam within the heat-cycling loop may be increased to a predetermined proportionate volume in order to have an appropriate steam to carbon ratio within the fuel processing system-components and the SOFC whenever the fuel is introduced to the fuel processing system for normal power plant operation.

The forming gas may also be distributed throughout virtually all of the components of the power plant upon shut-down of the plant to minimize oxidation of plant components. The present power plant benefits enormously by having the forming gas storage container maintained as a component of the plant that is necessary for preserving plant components during shutdown. By using the same, integral plant component of the forming gas within its supply container or tank for heat transfer and steam generation during start-up, the power plant accomplishes a "bootstrap" start-up because the plant relies upon integral or existing plant components to achieve an efficient and rapid start-up without relying upon any non-plant based energy or steam sources.

Accordingly, it is a general object to provide a solid oxide fuel cell power plant with a bootstrap start-up system that overcomes deficiencies of the prior art.

It is a more specific object to provide a solid oxide fuel cell power plant with a bootstrap start -up system that enhances efficiencies of operation of the power plant and decreases costs of manufacture and maintenance of the power plant. These and other objects and values of the present disclosure will become apparent in the following detailed description and the accompanying drawing.

BRIEF DESCRIPTION OF THE DRAWINGS

FIG. 1 is a simplified schematic drawing showing a solid oxide fuel cell power plant having a bootstrap startup system constructed in accordance with the present disclosure.

DESCRIPTION OF THE PREFERRED EMBODIMENTS

Referring to the drawings in detail, a solid oxide fuel cell power plant having a bootstrap start-up system is shown in FIG. 1 and is generally designated by reference numeral 10. The power plant 10 includes at least one solid oxide fuel cell 12 (hereinafter occasionally referred to as an "SOFC") having a cathode flow field 14 that is configured for receiving a flow of an oxidant reactant through a cathode inlet line 16 from a compressed oxidant supply 18. The oxidant may come from the compressed supply 18 or may be atmospheric air directed through an oxidant compressor 20. The cathode flow field 14 is also configured for directing flow of the oxidant reactant through the cathode flow field 14 in fluid communication with a cathode electrode side 22 of an electrolyte 24. An anode flow field 26 is configured for receiving a flow of a hydrogen-rich reducing fuel through an anode inlet 28 from a fuel supply 30, such as natural gas as designated "NG" in association with reference numeral 30. The anode flow field 26 is also configured for directing flow of a reducing fuel adjacent an opposed anode electrode side 32 of the electrolyte 24 and out of the fuel cell through an anode exhaust 34.

A fuel processing system 36 is secured in fluid communication between the fuel supply 30 and the anode inlet 28. The fuel processing system 36 directs flow of the reducing fuel through at least one component 38 of the fuel processing system 36, such as a reformer component 38. The fuel processing system 36, as shown in FIG. 1 may also include an additional or second component 40 such as a desulfurizer 40. The fuel processing system 36 may also include other components neither shown nor illustrated herein that are known in the art. The system 36 processes a hydrogen-fuel that typically also includes carbon, such as natural gas, into a hydrogen-rich fuel that is appropriate for use within the SOFC 12.

A bootstrap start-up system 42 includes a direct fuel cathode air heater 44 that has a burner feed line 46 secured in fluid communication between the fuel supply 30 and a burner 48. The burner feed line 46 includes a burner inlet valve 50 for selectively permitting passage of the un-reformed fuel from the fuel supply 30 into the burner 48 and for prohibiting passage of the fuel into the burner 48. The direct fuel cathode air heater 44 also includes a fuel feed valve 52 secured to a fuel feed line 54 and a fuel processing system feed valve 56. When the fuel feed valve 52 is opened, un-reformed fuel flows from the fuel supply 30 through the feed valve 52 through the burner feed line 46 and into the burner 48. Simultaneously, the fuel processing system feed valve 56 is closed to prohibit entry of the un-reformed fuel into the fuel processing system 36. It is to be understood that any alternative valve arrangement or flow control arrangement that achieves the above described function may be used, such as a single three-way valve disposed in fluid communication between the fuel supply 30 and the burner fuel line 46 and the fuel processing system 36.

In starting up the SOFC power plant, the air compressor 20 is turned on to direct a flow of oxidant through the cathode inlet line 16 and through the cathode flow field 14. The air then passes through a cathode exhaust line 58 and into a first mixer 60 that is also secured in fluid communication with the burner inlet line 46. (FIG. 1 shows five separate mixers in illustrations showing squares surrounding the letter "M" to designate a fluid mixer.) The mixed air and unreformed fuel are directed from the first mixer 60 along the burner inlet line 46 into the burner 48. The burner 48 combusts the fuel and air mixture and very hot combusted gases pass out of the burner 48 into a burner exhaust line 62 that is secured in fluid communication between the burner 48 and a cathode air heat exchanger 64. The cathode air heat exchanger 64 is secure in heat exchange relationship between the burner exhaust line 62 and the cathode inlet line 16 for transferring heat from the burner exhaust line 62 into the cathode inlet line 16. The cathode inlet line 16 directs the heated cathode air adjacent the cathode electrode 22 side of the electrolyte 24.

The bootstrap start-up system 42 also includes a heat-cycling loop 66 that is secured in fluid communication between the anode exhaust 34 and the anode inlet 28. (For purposes of efficiency and ease of identification, the several gas and steam flow containing conduits or lines of the heat-cycling loop 66 are shown in FIG. 1 as having double lines, unlike the single lines used to designate other power plant 10 conduits, such as the burner feed line 46.) The heat-cycling loop 66 is also configured to receive a predetermined fill-volume of a forming gas 68 from a forming gas supply 70. In FIG. 1, the forming gas supply 70 displays "N2/H2" to represent a possible "dilute hydrogen" forming gas that may include about four percent hydrogen gas and ninety-six percent nitrogen gas. The forming gas supply 70 is secured in fluid communication with a forming gas inlet line 72 and a forming gas inlet valve 74 for selectively permitting passage of the forming gas 68 through the forming gas inlet line 72, and through the inlet line into a second mixer 75 that is secured in fluid communication with both the forming gas inlet line 72 and the heat-cycling loop 66. (By the phrase "predetermined fill-volume", it is meant a volume of forming gas 68 that fills about an entire interior void defined by the heat-cycling loop 66 and all voids defined by the components described herein through which the loop 66 directs flow of the forming gas 68.)

The heat-cycling loop 66 cycles flow of the forming gas 68 received from the forming gas inlet 72 continuously throughout the loop 66. The heat-cycling loop 66 includes a heat-cycling loop blower 76 that forces the forming gas to continuously circulate through the heat-cycling loop 66. As shown in FIG. 1, after leaving the second mixer 75 the forming gas flows along and through a return line 78 that directs the forming gas through the fuel processing system 36 and into an inlet segment 80 of the loop 66 and then into the anode flow field 26. The forming gas then receives heat from the electrolyte 24 and passes out of the anode flow field 26 into an exhaust segment 82 of the loop 66.

The heat-cycling loop 66 may also include a fuel cell heat exchanger 84 secured in heat exchange relationship with the exhaust segment 82 of the loop 66 and with the inlet segment 80 of the loop 66. The fuel cell heat exchanger 84 may be dimensioned so that very hot forming gas leaving the SOFC 12 in the exhaust segment 82 of the loop 66 immediately transfers some heat back into the fuel cell 12 through the forming gas passing through the inlet segment 80 of the loop 66 just upstream of the anode flow field 26 in order to provide more heat to the fuel cell 12 than to specific components of the fuel processing system 36.

The reformer 38 of the fuel processing system 36 may be secured so that the forming gas 68 circulating through the heat-cycling loop 66 passing through the return line 78 passes through the reformer 38 to heat it to an optimal operating temperature. The loop 66 may also include a reformer heat exchanger 86 secured in fluid communication with a middle segment 88 of the loop 66. The middle segment 88 of the loop 66 is secured in heat exchange relationship with the reformer heat exchanger 86 and directs flow of the heated forming gas in a direction away from the fuel cell heat exchanger 84. The heat-cycling loop 66 continues to direct flow of the heated forming gas through the middle segment 88 and away from the reformer heat exchanger 86 to the heat-cycling loop blower 76. Again, the loop blower 76 forces the circulating flow of the forming gas 68 through the loop 66. The blower 76 forces flow of the forming gas back toward the fuel cell 12 through a first return segment 90 and through a second return segment 92 of the heat-cycling loop 66.

The reformer heat exchanger 86 is also secured in heat exchange relationship between the middle segment 88 and the first return segment 90 of the heat-cycling loop 66. The first return segment 90 of the loop directs flow of the returning forming gas from the blower 76 into the reformer 38. The reformer heat exchanger 86 is dimensioned to extract heat from the forming gas in the middle segment 88 and to transfer that heat into the forming gas passing through the first return segment 90 in order to facilitate heating of the reformer 38 to a predetermined optimal temperature.

The desulfurizer 40 fuel processing system 36 component is secured in fluid communication with the heat-cycling loop 66 so that the desulfurizer 40 achieves a predetermined optimal temperature during start-up of the power plant 10. A desulfurizer heat exchanger 94 may be secured in heat exchange relationship with the middle segment 88 of the heat-cycling loop 66 and the second return segment 92 of the loop 66. The desulfurizer heat exchanger 94 may be dimensioned to extract heat from the forming gas 68 passing through the middle segment 88 and to transfer that heat into forming gas 68 passing through the second return segment 92 to facilitate transfer of an appropriate amount of heat into the desulfurizer 40.

Because the desulfurizer 40 may achieve an optimal temperature before the reformer 38 and the SOFC 12, a fuel processing system component bypass loop 96 may be defined by the heating-cycling loop 66. For example, and as shown in FIG. 1, such a component bypass loop 96 may be in the form of a desulfurizer bypass loop 96. The component bypass loop 96 directs flow of the forming gas 68 to flow either from the middle segment 88 through the desulfurizer heat exchanger 94 and back through the second return segment 92 and again through the desulfurizer heat exchanger 94 and into the desulfurizer 40. Alternatively, the desulfurizer bypass loop 96 may direct flow of the forming gas 68 from the middle segment 88 around the desulfurizer 40, through a bypass loop control valve 98 into the first return segment 90 and then into the reformer heat exchanger 86 and reformer 40. FIG. 1 shows that the forming gas 68 may flow from the control valve 98 through a third mixer 100 on the first return segment 90 and through a fourth mixer 102 secured in fluid communication between the first segment 90 of the return line and the section of the return line 78 downstream from the desulfurizer 40 and between the desulfurizer 40 and the reformer heat exchanger 86.

The desulfurizer bypass loop 96 may also be configured to or be controlled (such as by the controllable three-way valve 98) to direct a very substantial portion of the forming gas 68 from the middle segment 88 into the first return segment 90, while directing a small portion of the forming gas 68 to flow through the desulfurizer heat exchanger 94 and desulfurizer 40. As described above, the fuel processing system component bypass loop 96 may provide for the system components 38, 40 achieving an optimal operating temperature at the same time that the other system components 38, 40 and fuel cell 12 achieve optimal operating temperatures, wherein the fuel processing system components 38, 40 and the fuel cell 12 or an SOFC stack (not shown) require more heat than the desulfurizer 40. Dimensioning of, or control of flow through, the fuel stack heat exchanger 84, reformer heat exchanger 86, the desulfurizer heat exchanger 94 and any other fuel processing system components and associated heat exchangers (not shown) provide for an extremely efficient use of the heat generated by the direct fuel cathode heater 44 to preferably simultaneously achieve optimal operating temperatures of the SOFC and soy and all fuel processing system 36 components 38, 40 prior to permitting entry of any carbon from the fuel supply 30 into the fuel processing system components 38, 40 and fuel cell 12.

In an additional embodiment, the forming gas inlet valve 74 on the forming gas inlet 72 may be configured to permit a bleed in of small amounts of the forming gas 68 when the forming gas 68 includes dilute hydrogen during the start-up of the power plant 10. The addition of the dilute hydrogen forming gas 68 to the heat-cycling loop 66 permits a low level of operation of the SOFC 12 so that the resulting byproduct of water formed at the anode electrode 32 may become steam. The amount of steam within the heat-cycling loop 66 may be increased to a predetermined proportionate volume in order to have an appropriate steam to carbon ratio within the fuel processing system 36 and the SOFC 12 whenever the forming gas inlet valve 74 is closed to prohibit flow of the forming gas 68 through the valve 74, and whenever the fuel processing system feed valve 56 is open to permit flow of the un-reformed fuel from the fuel supply 30 into the fuel processing system 36 for normal power plant 10 operation.

The heat-cycling loop 66 is configured for sealed cycling flow of the forming gas 68 through the heat-cycling loop 66 during start-up of the power plant 10. The heat-cycling loop 66 continuously cycles the forming gas through the loop to transfer heat from the electrolyte 24 until the fuel cell 12 and components of the fuel processing system 36 achieve predetermined start-up temperatures. By "sealed cycling flow", it is meant that the heat-cycling loop 66 is sealed against intrusion by any other fluid (except a possible bleed-in of additional forming gas 68 as described herein), and is sealed against exhaust out of the loop 66 of the forming gas 68 during start-up of the power plant 10.

A preferred operation of the power plant 10 is to have adequate steam production by the dilute hydrogen within the forming gas 68 cycling through the heating-cycling loop 66 so that no additional steam is needed when the un-reformed fuel is directed to flow in the fuel processing system 36. When the plant start-up achieves a predetermined temperature and steam volume within the fuel cell 12 and the fuel processing system 36, the plant 10 transitions to normal operation. The burner inlet valve 50 is closed and the fuel processing system feed valve 56 is opened to permit flow of non-reformed fuel through the fuel processing system 36 so that reformed, hydrogen-rich fuel then passes through the anode flow field 26. As the increased amount of fuel passes through the fuel cell 12, additional steam is produced. During such normal, non-start-up operation of the power plant 10, the exhaust segment 82, middle segment 88, return segments 78, 90, 92, and the recycle loop 96 continue to cycle an anode exhaust stream through the described fuel cell heat exchanger 84, fuel processing system reformer exchanger 86 and desulfurizer heat exchanger 94 and other fuel processing system components 38, 40 to sustain appropriate temperatures and volumes of steam within the components.

However, if the power plant cannot provide adequate steam, or additional steam is needed occasionally for specific operating conditions, a de-ionized water supply 104 may be directed into the power plant 10 through a de-ionized water inlet line 106 including a de-ionized inlet valve 107 and a first anode exhaust heat exchanger 108 which turns the de-ionized water into steam. The inlet line 106 may direct the de-ionized steam from the heat exchanger into the third mixer 100 and optionally into the fourth mixer 102 in fluid communication with the first return segment 90 of the heat-cycling loop 66, as shown in FIG. 1.

In normal operation of the power plant 10 after start-up, the hot anode exhaust may pass from the exhaust segment 82 into an anode exhaust three-way control valve 110 to selectively control a portion of the hot anode exhaust to flow directly into the fuel cell heat exchanger 84, or instead to flow all or a portion of the hot anode exhaust from the exhaust segment 82 of the heat cycling loop 66, out of the loop 66 through the valve 110 and into a first anode exhaust segment 111 that feeds a second anode exhaust heat exchanger 113 secured in heat exchange relationship between the anode exhaust segment 111 and the heat-cycling loop return line 78 upstream from the reformer 38 and downstream from the desulfurizer 40 to better control optimal heat requirements for the reformer 38 and other components. The hot anode exhaust then leaves the second anode exhaust heat exchanger 113 through a second anode exhaust segment 115 secured between the heat exchanger 113 and the first mixer 60 on the burner inlet line 46. During normal operation of the power plant 10, the burner inlet valve 50 on the inlet line 46 is closed to prohibit direct flow of the fuel into the burner 48. Therefore, unburned fuel in the hot anode exhaust is burned in the burner 48. The first mixer 60 also secured to the cathode exhaust line 58 so that cathode air passing out of the fuel cell 12 may mix with the unused fuel in the anode exhaust to effect combustion of the fuel in the burner 46. This also prevents unused, un-combusted fuel from escaping the plant 10 into the ambient environment.

A cathode exhaust control valve 112 may be secured to the cathode exhaust line 58 to direct portions of the cathode exhaust air around the burner 46 through a burner by-pass line 114 and into a fifth mixer 116 downstream from the burner 46 and in fluid communication with the burner exhaust line 62. This provides for the hot cathode exhaust air contributing to the hot burner exhaust combining in the fifth mixer 116 to supply as much heat as is reasonably possible to the cathode air heat exchanger 64 to heat incoming oxidant prior to entry into the fuel cell 12. After the combined hot burner exhaust and hot cathode exhaust pass through the cathode air heat exchanger 64, as shown in FIG. 1, the combined hot exhausts may be directed through a third anode exhaust segment 118 secured between the cathode air heat exchanger 64 and the first anode exhaust heat exchanger 108 to turn the de-ionized water to steam, as described above. The combined cathode and anode exhaust is then directed from the first anode exhaust heat exchanger 108 through an extension of the third anode exhaust segment 118 and out of the power plant 10 through a plant exhaust 120.

The power plant 10 may also include forming gas direct feed valve 122 secured between the forming gas supply 70 and the burner feed line 46 for use of the forming gas as an inert gas upon shut down of the power plant. Whenever the power plant 10 is shut down for maintenance, repair, etc., the forming gas may be used as an inert gas with a beneficial modest amount of hydrogen to minimize oxidation of plant components. In such a circumstance, the forming gas may be directed through an open forming as inlet valve 74 to permit passage of the forming gas throughout the heat-cycling loop 66 to fill all of the components and conduits of the fuel processing system 36 and their heat exchangers 84, 86, 94, 113 and the anode side of the fuel cell 12. The inert forming gas may also be distributed through other plant components through the forming gas direct feed valve 122 secured between the forming gas inlet line 72 and the burner gas feed line 46 which directs flow of the forming gas through the burner 46, cathode flow field 14, the cathode air heat exchanger 64 and the first anode exhaust heat exchanger 108. The three-way cathode exhaust valve 122 may also be controlled to permit flow of the forming gas 68 into and through the cathode flow field 14, and cathode air heat exchanger 64. The inert forming gas 68 may also flow from the first return segment 90 and the third mixer 100 into the de-ionized inlet line 106 to completely fill the power plant 10 conduits and components upon shutdown of the plant 10.

The present power plant 10 benefits enormously by having the forming gas 68 storage container 70 maintained as a component of the plant 10 that is necessary for preserving plant components during shutdown. By using the same, integral plant 10 component of the forming gas 68 within its supply container or tank 70 for heat transfer and steam generation during start-up, the power plant 10 accomplishes a "boot-strap" start-up because the plant 10 relies upon integral or existing plant components to achieve an efficient and rapid start-up without relying upon any non-plant based energy or steam sources.

While the above disclosure has been presented with respect to the described and illustrated embodiments of a solid oxide fuel cell power plant having a bootstrap start-up system, it is to be understood that the disclosure is not to be limited to those alternatives and described embodiments. For example, it is to be understood the above descriptions and illustrations focus upon a single solid oxide fuel cell 12. However, in ordinary operating power plants of the present disclosure it is likely that the fuel cell 12 will be one of many fuel cells cooperatively secured in a fuel cell stack assembly configured to produce a predetermined amount of electrical power and heat. Accordingly, reference should be made primarily to the following claims rather than the foregoing description to determine the scope of the disclosure.

What is claimed is:

1. A solid oxide fuel cell power plant, comprising:
   at least one solid oxide fuel cell having:
      an electrolyte;
      a cathode flow field configured to direct an oxidant reactant flow adjacent to a cathode electrode side of the electrolyte; and
      an anode flow field configured to direct a reducing fuel flow adjacent to an anode electrode side of the electrolyte;
   a fuel supply;
   a fuel processing system in fluid communication with the fuel supply and the anode flow field, the fuel processing system configured to process a hydrogen-rich fuel;
   a bootstrap start-up system that includes:
      a burner;
      a cathode air heat exchanger;
      a forming gas supply;
      a burner exhaust line in fluid communication between the burner and the cathode air heat exchanger;
      a heat-cycling loop blower; and
      a heat-cycling loop configured to receive a predetermined fill-volume of a forming gas from the forming gas supply and to circulate the forming gas through the heat-cycling loop blower, through the fuel processing system, through the anode flow field adjacent to the anode electrode side of the electrolyte, and back to the heat-cycling loop blower, the heat-cycling loop configured to cycle heat from the electrolyte during a start-up phase of the power plant until the fuel cell and the fuel processing system reach predetermined start-up temperatures.

2. The solid oxide fuel cell power plant of claim 1, further comprising a direct fuel cathode air heater including a burner feed line in fluid communication between the fuel supply and the burner.

3. The solid oxide fuel cell power plant of claim 1, further comprising a cathode inlet line configured to direct heated air from the cathode air heat exchanger to the cathode flow field.

4. The solid oxide fuel cell power plant of claim 1, wherein the fuel processing system includes a reformer that is configured to be heated to a first operating temperature by the forming gas circulated through a return line of the heat-cycling loop, and the heat-cycling loop further includes a reformer heat exchanger, placed in a first return segment of the heat-cycling loop, upstream of the reformer, the reformer heat exchanger being dimensioned to transfer heat from the forming gas circulated through a middle segment of the heat-cycling loop to the forming gas that flows through the first return segment of the heat-cycling loop to increase a temperature of the reformer.

5. The solid oxide fuel cell power plant of claim 4, wherein the fuel processing system further includes a desulfurizer configured to be heated to a first operating temperature by the forming gas circulated through the heat-cycling loop through a second return segment of the heat-cycling loop, and the heat-cycling loop further includes a desulfurizer heat exchanger, placed in the second return segment of the heat-cycling loop, upstream of the desulfurizer, the desulfurizer heat exchanger being dimensioned to transfer heat from the forming gas circulating through the middle segment of the heat-cycling loop to the forming gas flowing through the second return segment of the heat-cycling loop to increase a temperature of the desulfurizer.

6. The solid oxide fuel cell power plant of claim 1, wherein the fuel processing system further includes a first component configured to be heated to a first operating temperature by the forming gas circulated through the heat-cycling loop through a return segment of the heat-cycling loop, and the heat-cycling loop further includes a heat exchanger, placed in the return segment of the heat-cycling loop, upstream of the first component, and the heat-cycling loop also comprises a bypass configured to direct flow of all or a portion of the forming gas through one of the heat exchanger and the return segment of the heat-cycling loop downstream of the first component.

* * * * *